(12) United States Patent
Ahn et al.

(10) Patent No.: US 8,142,936 B2
(45) Date of Patent: Mar. 27, 2012

(54) NON-AQUEOUS ELECTROLYTE AND LITHIUM SECONDARY BATTERY USING THE SAME

(75) Inventors: Soon Ho Ahn, Daejeon (KR); Jae Hyun Lee, Daejeon (KR); Jeong Ju Cho, Daejeon (KR); Ho Chun Lee, Daejeon (KR); Mi Young Son, Seoul (KR); Hyeong Jin Kim, Daejeon (KR); Han Ho Lee, Daejeon (KR)

(73) Assignee: LG Chem, Ltd. (KR)

( * ) Notice: Subject to any disclaimer, the term of this patent is extended or adjusted under 35 U.S.C. 154(b) by 1090 days.

(21) Appl. No.: 10/588,481

(22) PCT Filed: Feb. 10, 2004

(86) PCT No.: PCT/KR2004/000257
§ 371 (c)(1),
(2), (4) Date: Aug. 1, 2006

(87) PCT Pub. No.: WO2005/076403
PCT Pub. Date: Aug. 18, 2005

(65) Prior Publication Data
US 2007/0141475 A1    Jun. 21, 2007

(51) Int. Cl.
*H01M 6/18* (2006.01)
(52) U.S. Cl. ........ 429/307; 429/329; 429/339; 429/340; 429/341; 429/199; 429/200; 429/326; 252/62.2
(58) Field of Classification Search .................. 429/326, 429/329, 339, 340, 341, 199, 200, 307; 252/62.2
See application file for complete search history.

(56) References Cited

U.S. PATENT DOCUMENTS

| 7,294,436 B2 * | 11/2007 | Abe et al. ...................... 429/329 |
| 2002/0018926 A1 | 2/2002 | Shiga et al. ...................... 429/61 |
| 2003/0118912 A1 * | 6/2003 | Watanabe et al. ............. 429/326 |

FOREIGN PATENT DOCUMENTS

| EP | 1 065 744 A2 | 1/2001 |
| EP | 1 335 445 A1 | 8/2003 |
| EP | 1 361 622 A1 | 11/2003 |
| JP | 10-321258 | 12/1998 |
| JP | 2000-331711 | 11/2000 |
| JP | 2002117895 | 4/2002 |
| JP | 2002260725 | 9/2002 |
| JP | 2002260725 A | 9/2002 |
| JP | 2002298909 A | 10/2002 |
| JP | 2003-22838 | * 1/2003 |
| JP | 2003051338 | 2/2003 |
| JP | 2003051338 A | 2/2003 |
| JP | 2003-257479 | * 9/2003 |
| JP | 2003257479 | 9/2003 |
| JP | 2003257479 A | 9/2003 |
| JP | 2003-308875 | * 10/2003 |
| JP | 2004134261 | 4/2004 |
| JP | 2005142157 | 6/2005 |
| WO | WO 02/31904 | * 4/2002 |
| WO | WO 02/054524 A1 | 7/2002 |
| WO | 02059999 A1 | 8/2002 |

OTHER PUBLICATIONS

Patent Office of the People's Republic of China; 200480041548.5; Mar. 14, 2008.
PCT International Search Report; PCT/KR2004/000257; Date: Oct. 21, 2004.
Written Opinion of the Inernational Searching Authority; PCT/KR2004/000257; Date: Oct. 21, 2004.
Supplementary European Search Report for Application No. EP 04 70 9768 dated Feb. 3, 2011.
Tobishima, et al., "Influence of electrolyte additives on safety and cycle life of rechargeable lithium cells", Journal of Applied Electrochemistry, vol. 33, No. 2, Feb. 1, 2003, pp. 143-150, XP001190311.
Xiao, et al., "Electrochemical behavior of biphenyl as polymerizable additive for overcharge protection of lithium ion batteries", Electrochimica Acta, Elsevier Science Publishers, Barking, GB. vol. 49, No. 24, Sep. 30, 2004, pp. 4189-4196, XP00452004.

* cited by examiner

*Primary Examiner* — Laura Weiner
(74) *Attorney, Agent, or Firm* — Cantor Colburn LLP

(57) ABSTRACT

The present invention relates to a nonaqueous electrolyte solution containing new additives and a lithium secondary battery including the same. More particularly, the invention relates to a nonaqueous electrolyte solution containing a lithium salt, an electrolyte compound, a first additive compound with an oxidation initiation potential of more than 4.2 V, and a second additive compound with an oxidation initiation potential of more than 4.2 V, which is higher in oxidation initiation potential than the first additive, and deposits oxidative products or form a polymer film, in oxidation, as well as a lithium secondary battery including the same. The present invention can provide a lithium secondary battery excellent in both the battery performance and the battery safety in overcharge by the combined use of the first additive and the second battery as additives to the nonaqueous electrolyte solution.

4 Claims, 3 Drawing Sheets

NON-AQUEOUS ELECTROLYTE AND LITHIUM SECONDARY BATTERY USING THE SAME

TECHNICAL FIELD

The present invention relates to a nonaqueous electrolyte solution and a lithium secondary battery including the same. More particularly, the present invention relates to a nonaqueous electrolyte solution containing additives capable of improving the battery safety in overcharge and performance, as well as a lithium secondary battery including the same.

BACKGROUND ART

An electrolyte solution for lithium secondary batteries is generally comprised of a combination of cyclic carbonate and linear chain carbonate. Examples of the cyclic carbonate include ethylene carbonate (EC), propylene carbonate (PC), gamma-butyrolactone (GBL), and the like. Typical examples of the linear chain carbonate include diethyl carbonate (DEC), dimethyl carbonate (DMC), ethyl methyl carbonate (EMC) and the like.

In order to improve the safety of batteries, various electrolyte additives are developed, and such additives improves the battery safety in overcharge by processes, such as gas generation, oxidation-reduction shuttle reaction and polymerization reaction.

For example, additives which use oxidation-reduction shuttle reaction include chloroanisole and the like. However, they are not effective at a high charge current.

Also, additives which use polymerization reaction include biphenyl, alkylbenzene derivatives, such as cyclohexylbenzene, and the like. These additives block the flow of a current by polymerization reaction in the overcharge condition of batteries. However, the single use of biphenyl has problems in that the battery resistance is increased, the battery performance is deteriorated and biphenyl has to be used in a large amount. Furthermore, the single use of alkylbenzene derivatives, such as cyclohexylbenzene, has problems in that a large amount of additives have to be used, resulting in deterioration in the battery performance.

DISCLOSURE OF THE INVENTION

Figure 1:
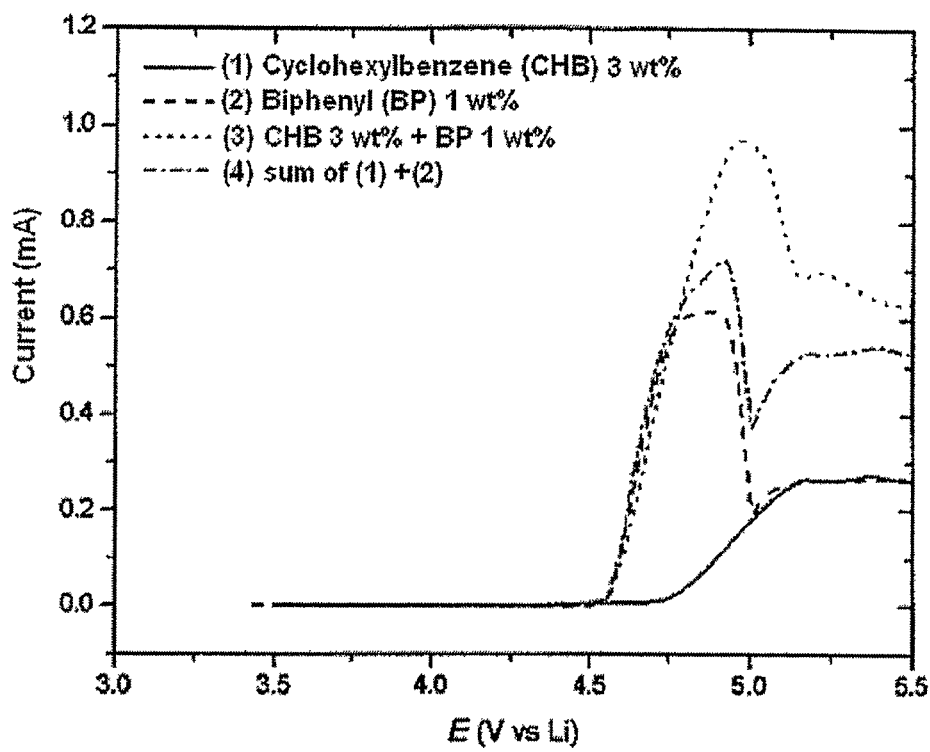
FIG. 1 is a graphic diagram showing a response current as a function of charge voltage in the use of electrolyte solutions containing cyclohexylbenzene, biphenyl and a combination of biphenyl and cyclohexylbenzene, respectively.

The present inventors have found that the combined use of two electrolyte additives selected from compounds having an oxidation initiation potential higher than the operating voltage of lithium secondary batteries, in which the first additive is lower in oxidation initiation potential than the second additive, and the second additive is higher in oxidation initiation potential and either deposits oxidative products or form a polymer film, shows the synergy effect capable of improving the battery safety in overcharge even in a lower addition amount than the single use of these additives. This improvement in the battery safety in overcharge even with a lower amount of the additives can prevent the battery performance from being deteriorated by the additives.

Accordingly, it is an object of the present invention to provide a nonaqueous electrolyte solution containing additives capable of improving the battery safety in overcharge without deteriorating the battery performance, as well as a lithium secondary battery including the same.

To achieve the above object, in one aspect, the present invention provides a nonaqueous electrolyte solution comprising the following components:
  i) a lithium salt;
  ii) an electrolyte compound;
  iii) a first additive compound with an oxidation initiation potential of more than 4.2 V; and
  iv) a second additive compound with an oxidation initiation voltage of more than 4.2 V, which is higher in oxidation initiation potential than the first additive, and deposits oxidative products or forms a polymer film, in oxidation.

In another aspect, the present invention provides a lithium secondary battery comprising the following components:
  a) a cathode capable of absorbing and releasing lithium ions;
  b) an anode capable of absorbing and releasing lithium ions;
  c) a porous separator; and
  d) a nonaqueous electrolyte solution comprising the following components:
    i) a lithium salt;
    ii) an electrolyte compound;
    iii) a first additive compound with an oxidation initiation potential of more than 4.2 V; and
    iv) a second additive compound with an oxidation initiation voltage of more than 4.2 V, which is higher in oxidation initiation potential than the first additive, and deposits oxidative products or forms a polymer film, in oxidation.

Hereinafter, the present invention will be described in detail.

The present invention is characterized by using, as additives to the nonaqueous electrolyte solution, the first additive with an oxidation initiation voltage of 4.2 V in combination with the second additive having an oxidation initiation voltage of more than 4.2 V, which is higher in oxidation initiation potential than the first additive, and deposits oxidative products or forms a polymer film, in oxidation.

In the present invention, a mechanism according to which the first and second additives can improve the battery safety in overcharge without deteriorating the battery performance is as follows.

The second additive is a compound which has an oxidation initiation potential of more than 4.2 V, the normal operating voltage of lithium secondary batteries, and deposits oxidative products or form a polymer film, in oxidation. In this regard, the sentence "deposits oxide" means that oxide is separated from a solution, such as an electrolyte solution, and exists on a solid surface, such as an electrode, but does not form a polymer film by polymerization reaction. Also, the sentence "forms an oxide film" means that a substance produced by oxidation forms a polymer film by polymerization reaction.

Accordingly, when the secondary additive is oxidized above the oxidation initiation voltage in the overcharge of batteries, the oxide or oxide film of the second additive will exist on the electrode surface.

The oxide or oxide film of the second additive existing on the electrode surface can inhibit the oxidation of the electrolyte solution on the electrode surface and increases the battery resistance, thus preventing overcharge from further proceeding. By this action, the second additive can improve the battery safety in overcharge. In this regard, the deposition of oxidative products or the formation of the oxide film on the electrode surface may also be visually observed, but even when the deposition of oxidative products or the formation of the oxide film is so low that it cannot be visually observed, it can contribute to the improvement in the battery safety as described above.

Meanwhile, the first additive is a compound which has an oxidation initiation potential of more than 4.2 V, the normal operating voltage of lithium secondary batteries, and is lower in oxidation initiation potential than the second additive. Thus, the first additive is oxidized faster than the second additive in the overcharge of batteries. In this regard, the oxidation of the first additive acts to promote the oxidation of the second additive or to remove impurities interfering with the formation of the oxide film in the oxidation of the second additive. Thus, the use of the first additive will further improve the effect of the second additive on the improvement of the battery safety in overcharge. This can achieve excellent battery safety even with a small amount of the additives and prevent the deterioration in the battery performance, which can occur by a large amount of the additives.

For the above-described mechanism, both the first and second additives must be substances with an oxidation initiation potential of more than 4.2 V, the normal operating voltage of lithium secondary batteries. Since aromatic compounds are generally higher in oxidation initiation potential than other substances, aromatic compounds with an oxidation initiation potential of more than 4.2 V may be used as the additives in the present invention, but the scope of the present invention is not limited to only these aromatic compounds. Among the aromatic compounds with an oxidation initiation potential of more than 4.2 V, benzene derivatives with an oxidation initiation voltage of more than 4.2 are preferably used as the additives in the present invention. Meanwhile, when the oxidation initiation potential of the additives is excessively high, there will be a problem in that the additives are not oxidized even in overcharge so that they cannot improve the battery safety. For this reason, the oxidation initiation potential of the additives is preferably less than 5.3 V. More preferably, the oxidation initiation potential of the additives is 4.5-4.9 V.

The first additive is not specifically limited insofar as it is a compound which has an oxidation initiation potential of more than 4.2 V in order to contribute to the improvement in the battery safety in overcharge by the above-described action and are lower in oxidation initiation potential than the second additive. The first additive does not need to necessarily deposit oxidative products or form a polymer film, in oxidation. However, the second additive must be a compound which has an oxidation initiation potential of 4.2 V and is higher in oxidation initiation potential than the first additive, and at the same time, deposits oxidative products or form a polymer film, in oxidation.

The present inventors measured oxidation initiation potentials for several aromatic compounds and visually evaluated the deposition of oxidative products or the formation of a polymer film, in oxidation. As a result, the following compounds with an oxidation initiation voltage of more than 4.2V could be selected. However, the scope of the present invention is not limited to only these compounds. Particularly, the deposition of oxidative products or the formation of a polymer film as given in Table 1 below was visually evaluated, and as described above, the effect of the present invention can be obtained even when the deposition of oxidative products or the formation of a polymer film is so low that it cannot be visually seen. Thus, the scope of the second additive in the present invention is not limited by the following results.

TABLE 1

| No. | Structure of compound | Oxidation initiation potential (V) | Deposition of oxidative products or formation of polymer film |
|---|---|---|---|
| 1 | (benzene) | 4.93 | X |
| 2 | (cyclohexylbenzene) | 4.78 | O |
| 3 | (toluene) | 4.78 | X |

TABLE 1-continued
| No. | Structure of compound | Oxidation initiation potential (V) | Deposition of oxidative products or formation of polymer film |
|---|---|---|---|
| 4 | 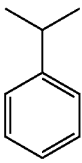 | 4.8 | ○ |
| 5 | 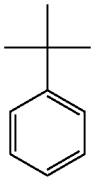 | 4.9 | ○ |
| 6 | 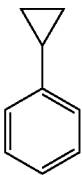 | 4.4 | X |
| 7 | 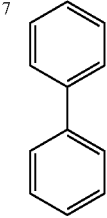 | 4.54 | ○ |
| 8 | 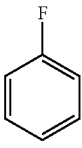 | 5.08 | X |
| 9 | 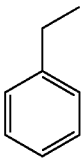 | 4.83 | ○ |
| 10 | 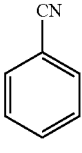 | 5.3 | X |
| 11 | 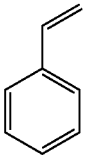 | 4.4 | X |

TABLE 1-continued

| No. | Structure of compound | Oxidation initiation potential (V) | Deposition of oxidative products or formation of polymer film |
|---|---|---|---|
| 12 | phenyl epoxide | 4.73 | X |
| 13 | diphenyl ether | 4.85 | X |
| 14 | 4-methylbenzonitrile | 5.1 | X |
| 15 | 1,4-di-tert-butylbenzene | 4.75 | X |
| 16 | 4-methylanisole (OMe para to Me) | 4.3 | ○ |
| 17 | 3-methylanisole (OMe meta to Me) | 4.3 | ○ |
| 18 | 4-fluorotoluene | 4.9 | X |
| 19 | 3-fluorotoluene | 4.95 | X |

TABLE 1-continued

| No. | Structure of compound | Oxidation initiation potential (V) | Deposition of oxidative products or formation of polymer film |
|---|---|---|---|
| 20 | 4-ethylbromobenzene | 4.8 | ○ |
| 21 | 4-methylphenyl acetate | 4.25 | X |
| 22 | 1,4-diisopropylbenzene | 4.3 | X |
| 23 | 1,3-diisopropylbenzene | 4.32 | X |
| 24 | p-xylene | 4.63 | X |
| 25 | 3-isopropylbiphenyl | 4.41 | ○ |
| 26 | diphenyl sulfide | 4.36 | X |

TABLE 1-continued
| No. | Structure of compound | Oxidation initiation potential (V) | Deposition of oxidative products or formation of polymer film |
|---|---|---|---|
| 27 | 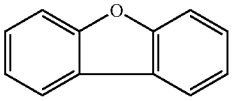 | 4.46 | ○ |
| 28 | 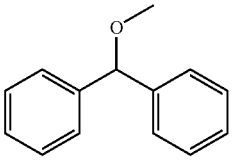 | 4.79 | ○ |
| 29 | 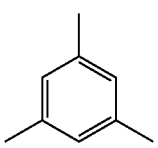 | 4.5 | X |
| 30 | 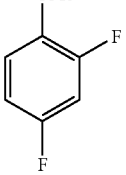 | 4.7 | X |
| 31 | 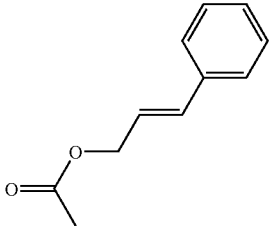 | 4.3 | ○ |
| 32 | 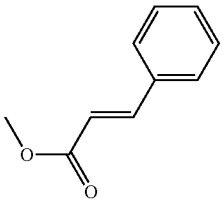 | 4.3 | X |
| 33 | 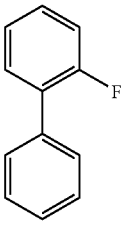 | 4.68 | ○ |
| 34 |  | 4.48 | ○ |
| 35 |  | 4.2 | ○ |

TABLE 1-continued

| No. | Structure of compound | Oxidation initiation potential (V) | Deposition of oxidative products or formation of polymer film |
|---|---|---|---|
| 36 | (2-chlorothiophene) | 4.65 | ○ |
| 37 | (3-methylthiophene) | 4.35 | ○ |
| 38 | (2,6-dimethylpyridine) | 5.04 | X |
| 39 | (2-nitrothiophene) | 5.2 | X |
| 40 | (2-cyanofuran) | 4.79 | X |
| 41 | (2-furylacetonitrile) | 4.3 | ○ |
| 42 | (3-cyanofuran) | 4.78 | X |

On the basis of the test results, examples of the first additive which can be used in the present invention include

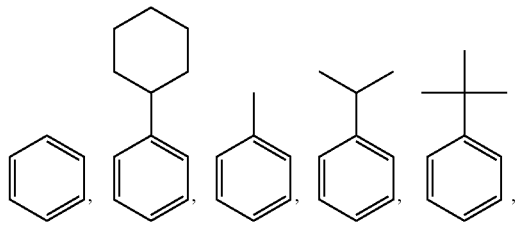

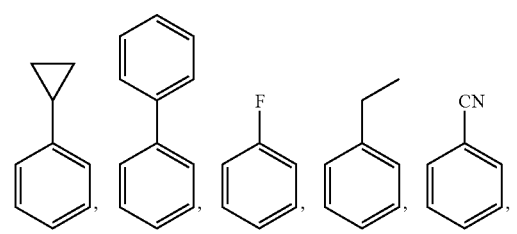

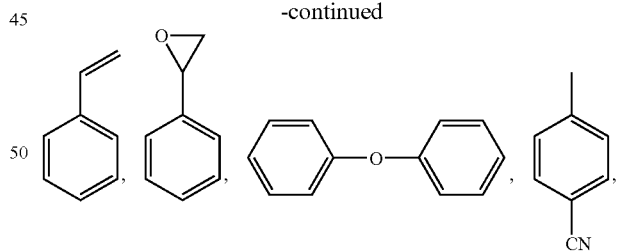

-continued

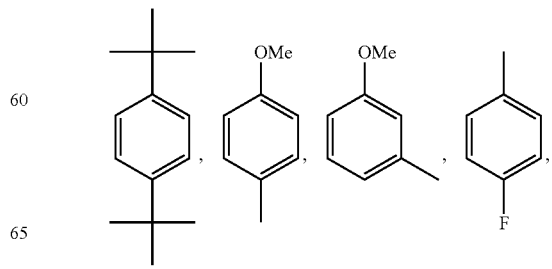

-continued
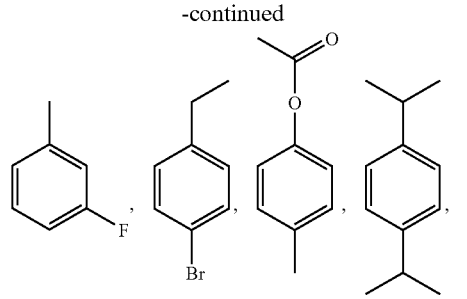
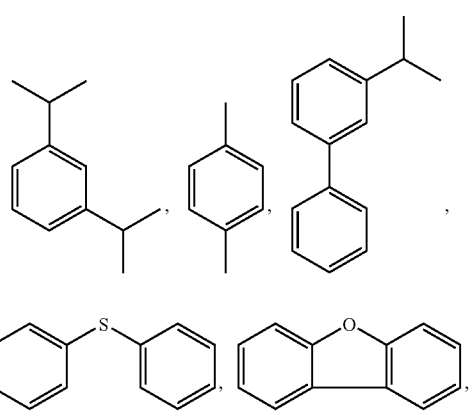
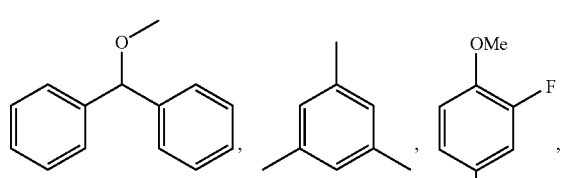
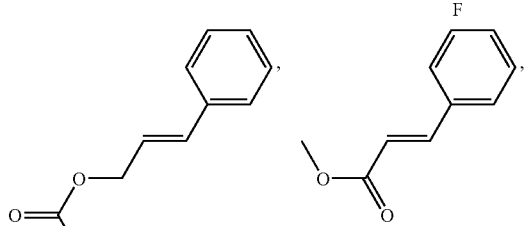
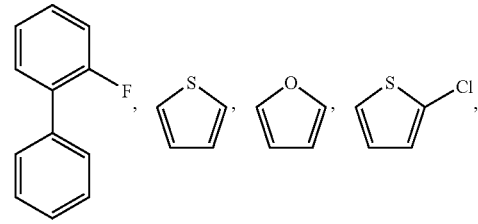
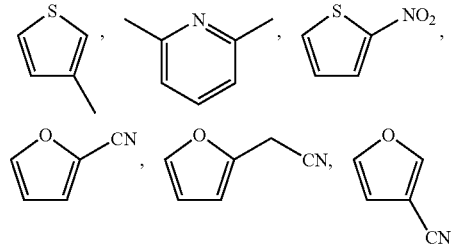
and the like. Also, examples of the second additive which can be used in the present invention include
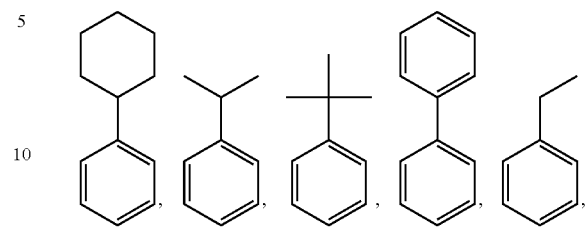
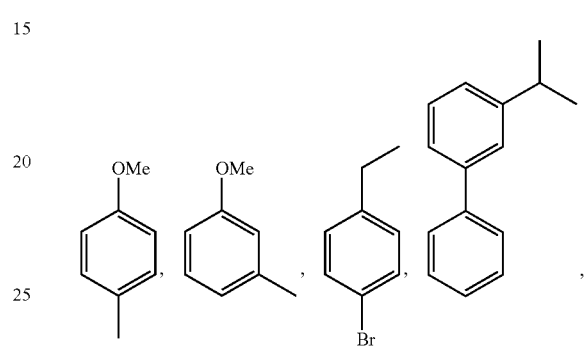
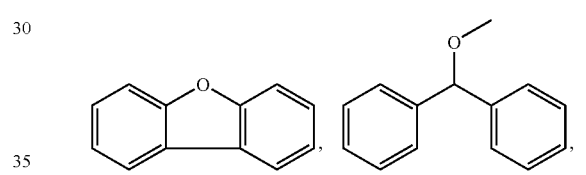
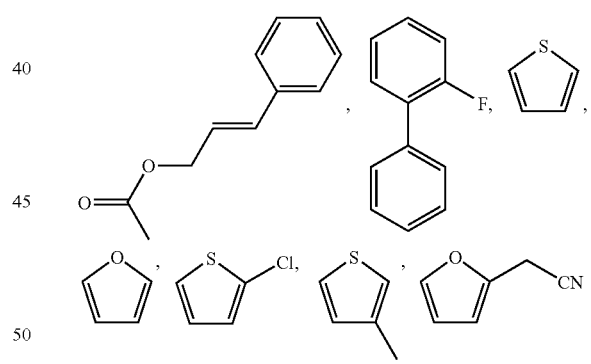
and the like. Particularly, in the present invention, it is preferable to use biphenyl as the first additive and cyclohexylbenzene

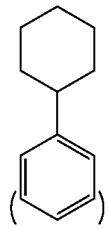

as the second additive.

A synergy effect exhibited by the combined use of the two additives can be confirmed by an example where biphenyl and cyclohexylbenzene are used as electrolyte additives in combination. A concrete description is as follows.

FIG. 1 shows a response current as a function of charge voltage for the single use of biphenyl (1), the single use of cyclohexylbenzene (2), and the combined use of biphenyl and cyclohexylbenzene. The response current as a function of charge voltage shows the extent of oxidation, and a greater response current shows a more oxidation. From FIG. 1, it can be seen that the combined use of biphenyl and cyclohexylbenzene (3) shows a greater current than that of the sum of the single use of cyclohexylbenzene (1) and the single use of biphenyl (2). This indicates that the oxidation is larger in the combined use of the two additives than in the single use of the additives.

Figure 2:
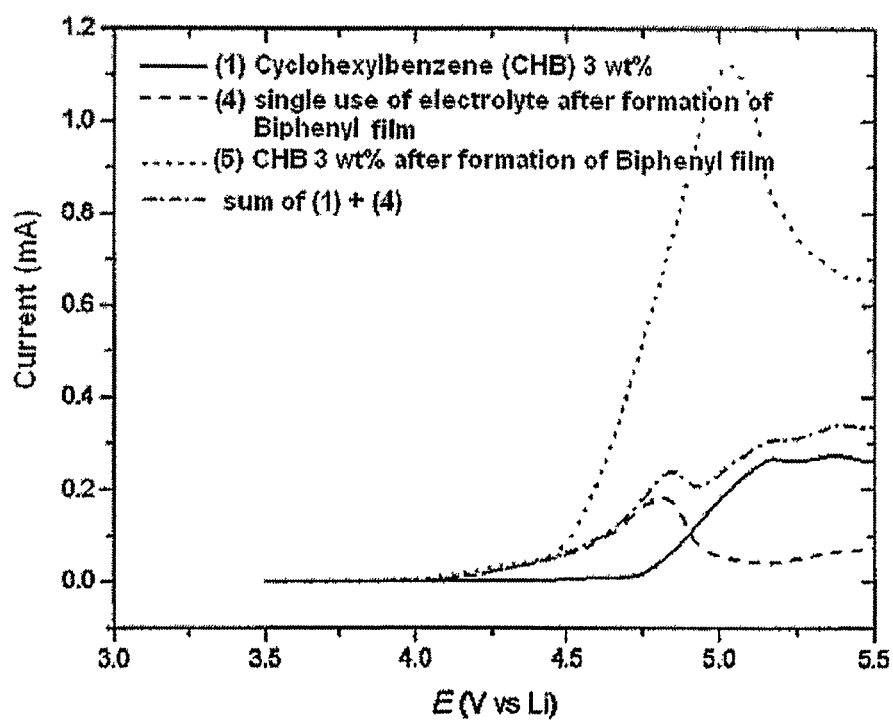
FIG. 2 is a graphic diagram showing a response current as a function of charge voltage in the use of each of an electrolyte solution containing only cyclohexylbenzene, an electrolyte solution where the oxidation of biphenyl has occurred, and an electrolyte solution containing cyclohexylbenzene where the oxidation of biphenyl has occurred, respectively.

The reason why the combined use of the two additives shows a more oxidation as shown in FIG. 1 is that the oxidation of biphenyl promotes the oxidation of cyclohexylbenzene. This phenomenon can be seen in FIG. 2. FIG. 2 shows a response current as a function of charge voltage in the use of each of an electrolyte solution containing only cyclohexylbenzene, an electrolyte solution where the oxidation of biphenyl has occurred, and an electrolyte solution containing cyclohexylbenzene where the oxidation of biphenyl has occurred. In the case where the electrolyte solution containing cyclohexylbenzene without biphenyl is subjected to oxidation (1), only a weak oxidation is observed. Also, in the case where the electrolyte solution containing only biphenyl without cyclohexylbenzene is subjected to oxidation (4), a weak oxidation is observed. However, the case where the electrolyte solution containing only biphenyl is subjected to oxidation and then the electrolyte solution containing 3% by weight of cyclohexylbenzene is subjected to oxidation (5), a very great oxidation is observed.

The first additive is preferably used in an amount of 0.1-2% by weight, and the second additive is preferably used in an amount of 0.5-5% by weight. If the content of the first additive is less than 0.1% by weight, the effect of the additive will be insufficient, and if the first additive is used in an amount of more than 2% by weight, it will result in an increase in the battery resistance, thus deteriorating the battery performance. Furthermore, if the content of the second additive is less than 0.5% by weight, the effect of the additive will be insufficient, and if the second additive is used in an amount of more than 5% by weight, it will increase the battery resistance, thus deteriorating the battery performance.

An electrolyte solution which can be used in the present invention may contain cyclic carbonate and linear chain carbonate. The cyclic carbonate is preferably at least one selected from the group consisting of ethylene carbonate (EC), propylene carbonate (PC), and gamma-butyrolactone (GBL). The linear chain carbonate is preferably at least one selected from the group consisting of diethyl carbonate (DEC), dimethyl carbonate (DMC), ethyl methyl carbonate (EMC) and methyl propyl carbonate (MPC).

The nonaqueous electrolyte solution contains a lithium salt, and examples of the lithium salt include, but are not limited to, those selected from the group consisting of $LiClO_4$, $LiCF_3SO_3$, $LiPF_6$, $LiBF_4$, $LiAsF_6$ and $LiN(CF_3SO_2)_2$.

In the lithium secondary battery according to the present invention, it is preferable to use carbon, lithium metal or alloy as a negative active material. It is also possible to use metal oxide, such as $TiO_2$ or $SnO_2$, which can absorb or release lithium ions and has a potential of less than 2 V with lithium.

In the lithium secondary battery according to the present invention, a lithium-containing transition metal oxide can be used as a positive active material. The lithium-containing transition metal oxide is preferably at least one selected from the group consisting of $LiCoO_2$, $LiNiO_2$, $LiMn_2O_4$, $LiMnO_2$ and $LiNi_{1-x}Co_xO_2$ ($0<x<1$). A positive electrode made of metal oxides, such as $MnO_2$, or a combination thereof, may also be used.

Moreover, in the preparation of the inventive lithium secondary battery, it is preferable to a porous separator, for example, a porous polyolefin separator.

The inventive lithium secondary battery can be prepared by any conventional method known in the art, for example, a method comprising interposing the porous separator between the anode and the cathode and introducing into the resulting structure the nonaqueous electrolyte solution containing a lithium salt, such as $LiPF_6$, and the additives.

The shape of the lithium secondary battery according to the present invention is preferably a cylindrical or angular can. Moreover, the battery may also be a pouch battery.

BEST MODE FOR CARRYING OUT THE INVENTION

Hereinafter, the present invention will be described in more detail by examples. It is to be understood, however, that these examples are provided for illustrative purpose only and are not construed to limit the scope of the present invention.

EXAMPLE 1

As an electrolyte solution, 1 M $LiPF_6$ solution with a composition of EC:PC:DEC=3:2:5 was used. And to the electrolyte solution, 0.2% by weight of biphenyl and 3% by weight of cyclohexylbenzene were added. An anode was made of synthetic graphite, and a cathode was made of $LiCoO_2$. Then, a 383562-type polymer battery was prepared and subjected to an overcharge test.

EXAMPLE 2

A polymer battery was prepared in the same manner as in Example 1 except that 0.5% by weight of biphenyl was used. The prepared battery was subjected to an overcharge test.

EXAMPLE 3

A polymer battery was prepared in the same manner as in Example 1 except that 1% by weight of biphenyl was used. The prepared battery was subjected to an overcharge test.

EXAMPLE 4

A polymer battery was prepared in the same manner as in Example 1 except that 2% by weight of biphenyl was used. The prepared battery was subjected to an overcharge test.

EXAMPLE 5

A polymer battery was prepared in the same manner as in Example 1 except that 0.5% by weight of fluorobiphenyl in place of biphenyl was used. The prepared battery was subjected to an overcharge test.

EXAMPLE 6

A polymer battery was prepared in the same manner as in Example 1 except that isopropylbenzene in place of cyclohexylbenzene was used. The prepared battery was subjected to an overcharge test.

EXAMPLE 7

A polymer battery was prepared in the same manner as in Example 1 except that 0.5% by weight of vinylbenzene in place of biphenyl was used and ethylbenzene in place of cyclohexylbenzene was used. The prepared battery was subjected to an overcharge test.

EXAMPLE 8

A polymer battery was prepared in the same manner as in Example 1 except that 0.5% by weight of toluene in place of biphenyl was used and t-butylbenzene in place of cyclohexylbenzene was used. The prepared battery was subjected to an overcharge test.

EXAMPLE 9

A polymer battery was prepared in the same manner as in Example 1 except that 0.5% by weight of mesitylene in place of biphenyl was used and bromoethylbenzene in place of cyclohexylbenzene was used. The prepared battery was subjected to an overcharge test.

EXAMPLE 10

A polymer battery was prepared in the same manner as in Example 1 except that 0.5% by weight of thiophene in place of biphenyl was used. The prepared battery was subjected to an overcharge test.

EXAMPLE 11

A polymer battery was prepared in the same manner as in Example 1 except that 0.5% by weight of furan in place of biphenyl was used and fluorobiphenyl in place of cyclohexylbenzene was used. The prepared battery was subjected to an overcharge test.

COMPARATIVE EXAMPLE 1

A polymer battery was prepared in the same manner as in Example 1 except that an electrolyte solution containing no biphenyl and cyclohexylbenzene. The prepared battery was subjected to an overcharge test.

COMPARATIVE EXAMPLE 2

A polymer battery was prepared in the same manner as in Example 1 except that an electrolyte solution containing 3% by weight of cyclohexylbenzene without biphenyl. The prepared battery was subjected to an overcharge test.

COMPARATIVE EXAMPLE 3

A polymer battery was prepared in the same manner as in Example 1 except that an electrolyte solution containing 3% by weight of biphenyl without cyclohexylbenzene. The prepared battery was subjected to an overcharge test.

COMPARATIVE EXAMPLE 4

A polymer battery was prepared in the same manner as in Example 1 except that an electrolyte solution containing 3% by weight of fluorobiphenyl in place of biphenyl without cyclohexylbenzene. The prepared battery was subjected to an overcharge test.

COMPARATIVE EXAMPLE 5

A polymer battery was prepared in the same manner as in Example 1 except that an electrolyte solution containing 3% by weight of vinylbenzene in place of biphenyl without cyclohexylbenzene. The prepared battery was subjected to an overcharge test.

Overcharge Test

Figure 3:
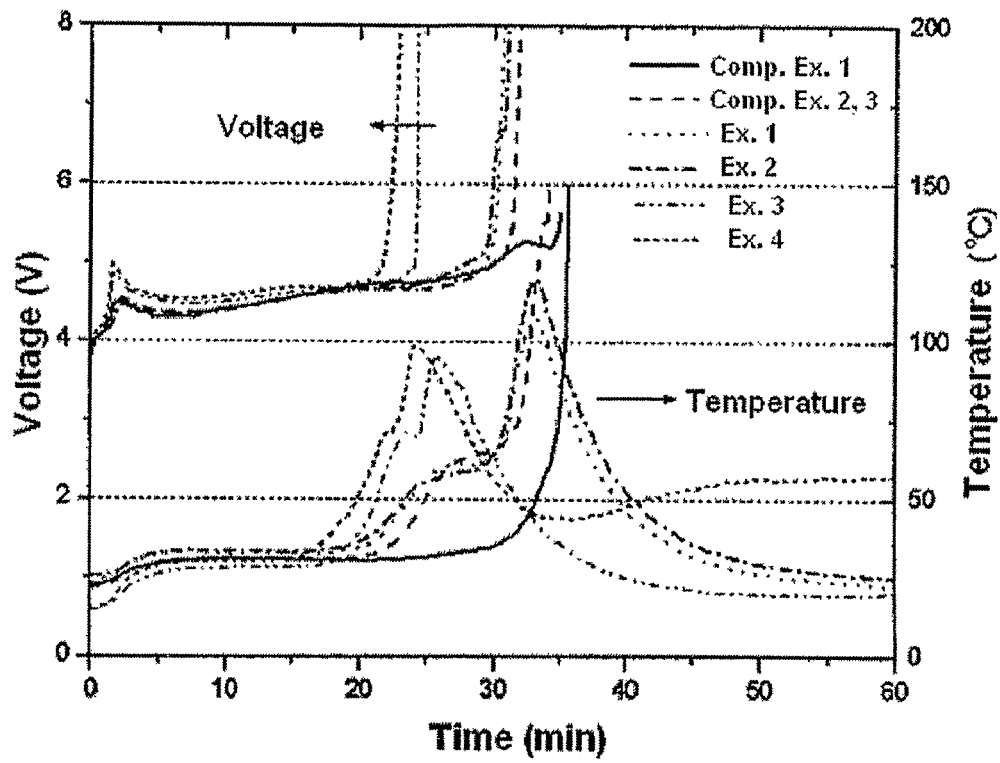
FIG. 3 shows changes in temperature and voltage during 12V/2 A overcharge tests for batteries prepared in Examples 1-4 and Comparative Examples 1-3.

The batteries prepared in Examples 1-4 and Comparative Examples 1-3 were subjected to an overcharge test in a condition of 12V/2 A while measuring the temperature of the batteries. The results are shown in FIG. 3. As can be seen in FIG. 3, the safety of the batteries prepared in Examples was improved as compared to the safety of the batteries prepared in Comparative Examples.

On the batteries prepared in Examples 1-4 and Comparative Examples 1-3, the overcharge test in a condition of 12V/2 A was repeated several times and the average of the results are shown in Table 2 below.

TABLE 2

| Kind of battery | Kind and addition amount (wt %) of additives | Peak temperature (° C.) | Time to peak temperature (minute) |
| --- | --- | --- | --- |
| Example 1 | 3% of cyclohexylbenzene and 0.2% of biphenyl | 109 | 33 |
| Example 2 | 3% of cyclohexylbenzene and 0.5% of biphenyl | 113 | 33 |
| Example 3 | 3% of cyclohexylbenzene and 1.0% of biphenyl | 105 | 27 |
| Example 4 | 3% of cyclohexylbenzene and 2.0% of biphenyl | 101 | 26 |
| Comparative Example 1 | No | Caught fire | 33 |

TABLE 2-continued

| Kind of battery | Kind and addition amount (wt %) of additives | Peak temperature (° C.) | Time to peak temperature (minute) |
|---|---|---|---|
| Comparative Example 2 | 3% of cyclohexylbenzene | Caught fire | 33 |
| Comparative Example 3 | 3% of biphenyl | Caught fire | 33 |

As shown in Table 2 above, as the sum of the addition amount of cyclohexylbenzene and the addition amount of biphenyl increased, the peak temperature in overcharge was lowered. This indicates that as the sum of the addition amount of cyclohexylbenzene and the addition amount of biphenyl increases, the battery safety in overcharge is improved. Meanwhile, in the batteries where cyclohexylbenzene and biphenyl were either not added or added alone, the batteries caught fire.

Figure 4:
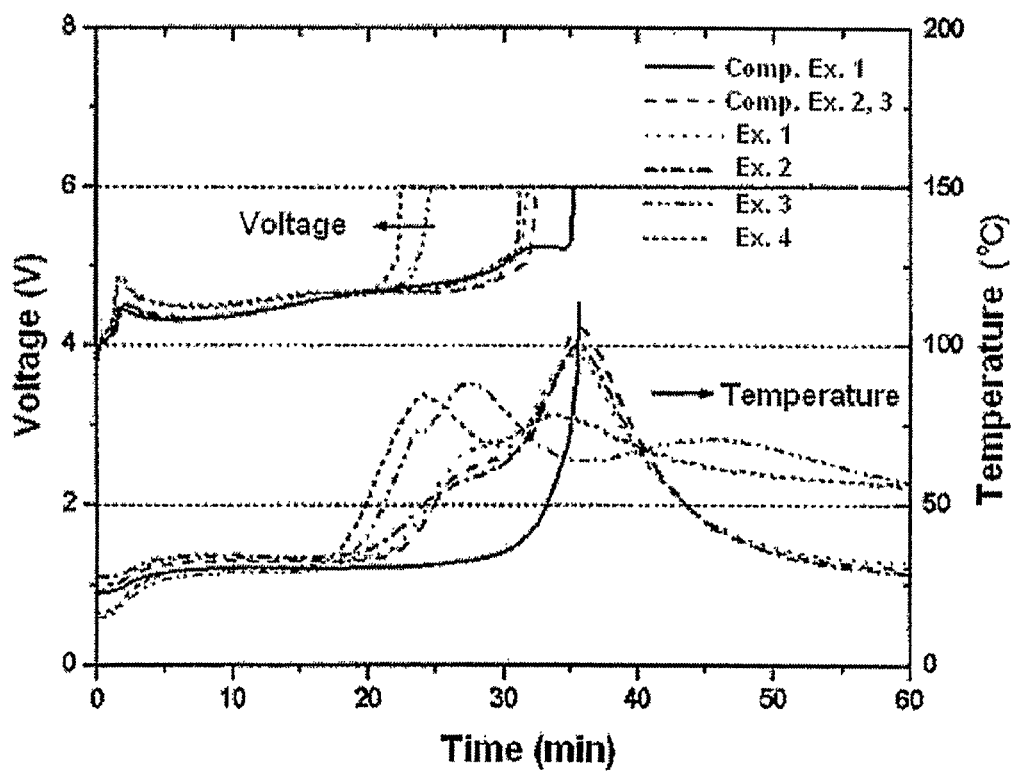
FIG. 4 shows changes in temperature and voltage during 6V/2 A overcharge tests for batteries prepared in Examples 1-4 and Comparative Examples 1-3.
Figure 5:
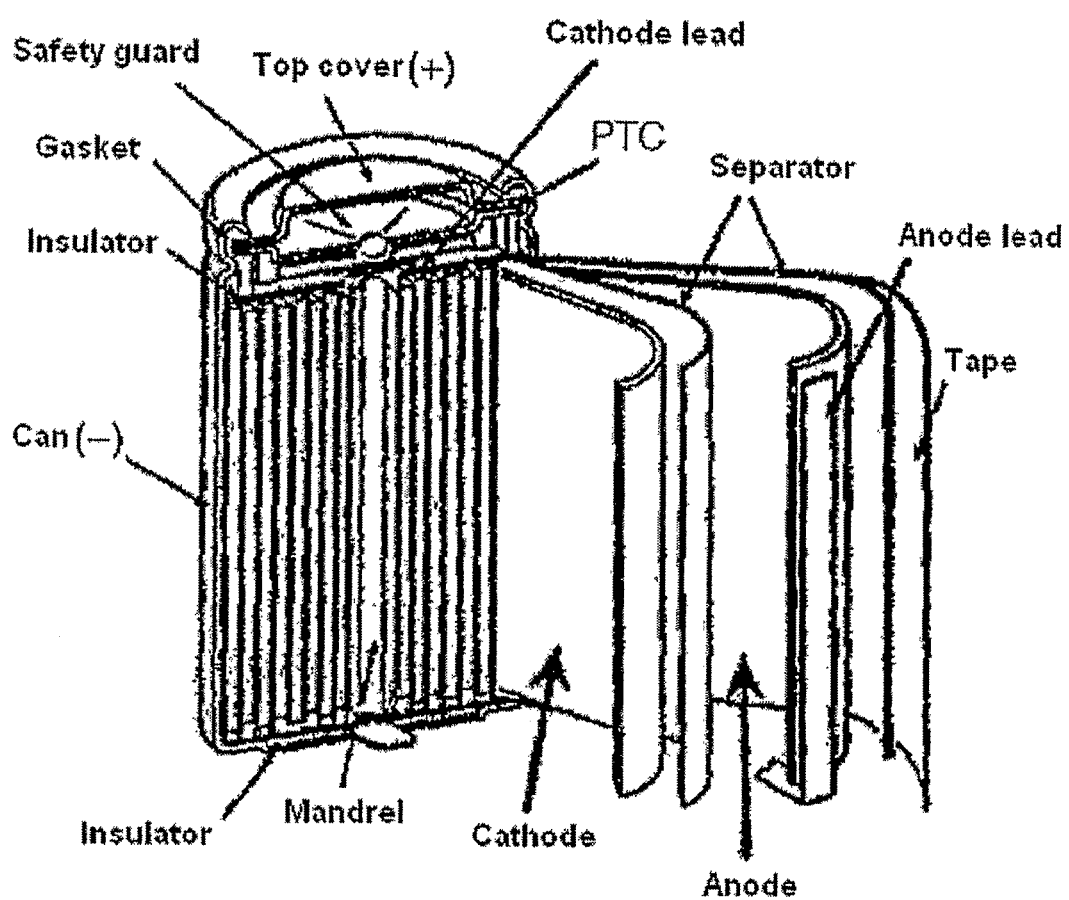
FIG. 5 shows the structure of a battery according to one embodiment of the present invention.

The batteries prepared in Examples 1-4 and Comparative Examples 1-3 were subjected to an overcharge test in a condition of 6V/2 A while measuring the temperature of the batteries. The results are shown in FIG. 4. As can be seen in FIG. 4, the safety of the batteries prepared in Examples was improved as compared to the safety of the batteries prepared in Comparative Examples.

On the batteries prepared in Examples 1-4 and Comparative Examples 1-3, the overcharge test in a condition of 6V/2 A was repeated several times and the average of the results are shown in Table 3 below.

TABLE 3

| Kind of battery | Kind and addition amount (wt %) of additives | Peak temperature (° C.) | Time to peak temperature (minute) |
|---|---|---|---|
| Example 1 | 3% of cyclohexylbenzene and 0.2% of biphenyl | 100 | 35 |
| Example 2 | 3% of cyclohexylbenzene and 0.5% of biphenyl | 100 | 34 |
| Example 3 | 3% of cyclohexylbenzene and 1.0% of biphenyl | 88 | 29 |
| Example 4 | 3% of cyclohexylbenzene and 2.0% of biphenyl | 84 | 26 |
| Comparative Example 1 | No | Caught fire | 34 |
| Comparative Example 2 | 3% of cyclohexylbenzene | 105 | 34 |
| Comparative Example 3 | 3% of biphenyl | 105 | 34 |

As shown in Table 3 above, as the sum of the addition amount of cyclohexylbenzene and the addition amount of biphenyl increased, the peak temperature in overcharge was lowered. This indicates that as the sum of the addition amount of cyclohexylbenzene and the addition amount of biphenyl increases, the battery safety in overcharge is improved. Meanwhile, in the batteries where cyclohexylbenzene and biphenyl were not added, the batteries caught fire. In the batteries where the additives were added alone, the peak temperature in overcharge was higher than the peak temperature of the batteries prepared in Examples in overcharge.

An overcharge test in a condition of 6V/1 C was performed on the batteries prepared in Examples 5-11 and Comparative Examples 3-5. The overcharge test was repeated three times, and among the overcharge tests, the number of tests where the batteries caught fire is shown in Table 4 below.

TABLE 4

| Kind of battery | Kind and addition amount (wt %) of additives | Number of tests where fire was caught |
|---|---|---|
| Example 5 | 0.5% of fluorobiphenyl and 3% of cyclohexylbenzene | 0 |
| Example 6 | 0.5% of biphenyl and 3% of isopropylbenzene | 0 |
| Example 7 | 0.5% of vinylbenzene and 3% of ethylbenzene | 0 |
| Example 8 | 0.5% of toluene and 3% of t-butylbenzene | 0 |
| Example 9 | 0.5% of mesitylene and 3% of bromoethylbenzene | 1 |
| Example 10 | 0.5% of thiophene and 3% of cyclohexylbenzene | 1 |
| Example 11 | 0.5% of furan and 3% of fluorobiphenyl | 1 |
| Comparative Example 3 | 3% of biphenyl | 3 |
| Comparative Example 4 | 3% of fluorobiphenyl | 3 |
| Comparative Example 5 | 3% of vinylbenzene | 3 |

As shown in Table 4 above, the batteries of Examples where the two additives have been used in combination showed excellent safety in overcharge as compared to the batteries of Comparative Examples where only one additive has been used.

Industrial Applicability

As can be seen from the foregoing, the inventive electrolyte solution containing both the two additives can greatly improve the battery safety in overcharge even with a small amount of the additives, and thus, can provide a lithium secondary excellent in both the battery performance and the battery safety.

The invention claimed is:

1. A nonaqueous electrolyte solution comprising the following components:
    i) a lithium salt;
    ii) an electrolyte solvent;
    iii) a first additive compound with an oxidation initiation potential of 4.2-5.3 V; and
    iv) a second additive compound with an oxidation initiation voltage of 4.2-5.3 V, which is higher in oxidation initiation potential than the first additive, and which deposits oxidative products or forms a polymer film, in oxidation, and
    wherein the first additive and the second additive are respectively vinylbenzene and ethylbenzene; toluene and t-butylbenzene; mesitylene and bromoethylbenzene; or furan and fluorobiphenyl.

2. The nonaqueous electrolyte of claim 1, wherein the content of the first additive is 0.1-2% by weight, and the content of the second additive is 0.5-5% by weight.

3. A lithium secondary battery comprising the following components:
    a) a cathode capable of absorbing and releasing lithium ions;
    b) an anode capable of absorbing and releasing lithium ions;
    c) a porous separator; and
    d) the nonaqueous electrolyte solution according to claim 1.

4. The lithium secondary battery of claim 3, wherein the content of the first additive compound is 0.1-2% by weight, and the content of the second additive compound is 0.5-5% by weight.

* * * * *